July 16, 1940.    L. J. SCHWANKE    2,207,828
APPARATUS FOR MAKING EXTRACTIONS FROM ORGANIC SUBSTANCES
Filed Oct. 27, 1937
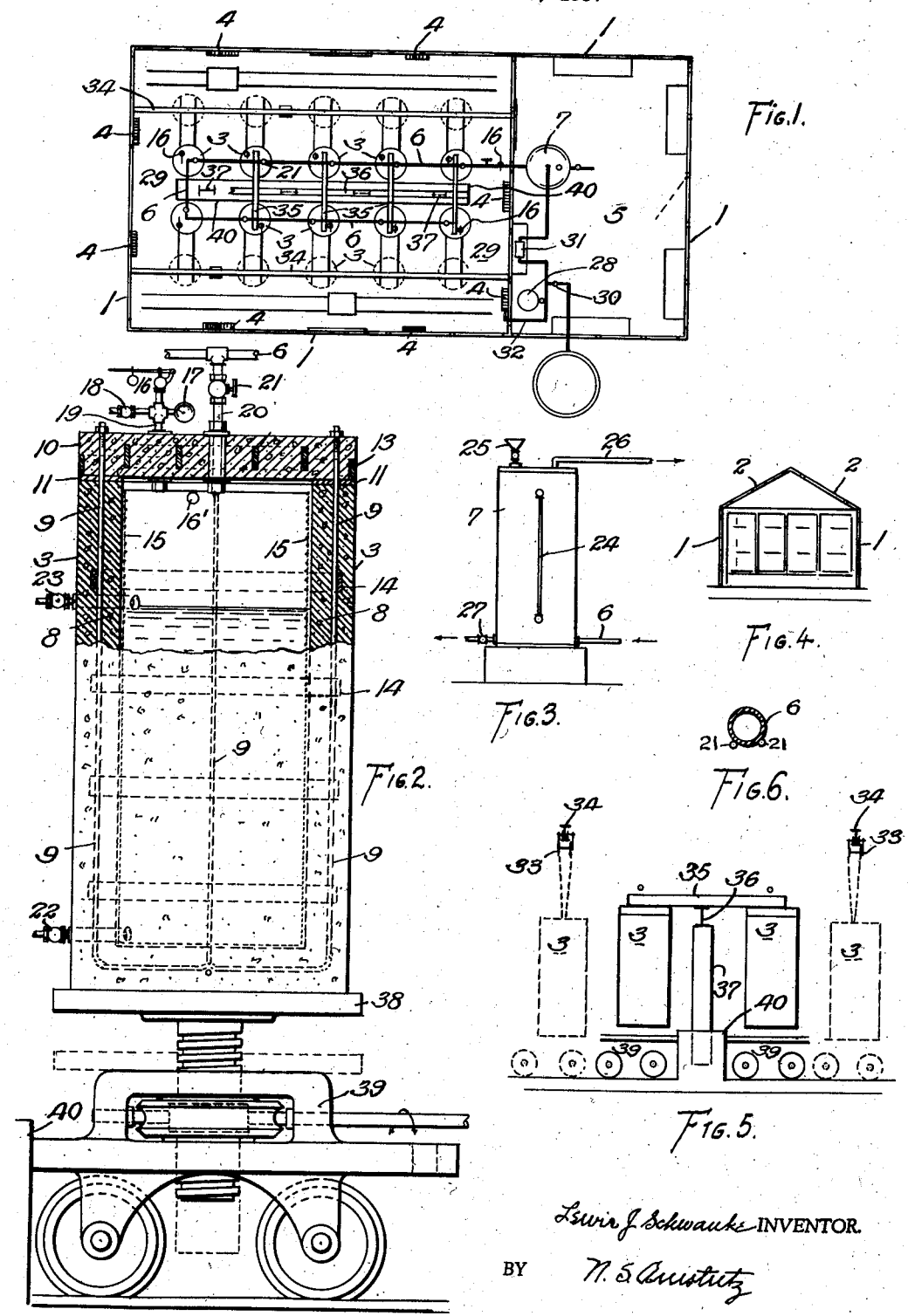

Patented July 16, 1940

2,207,828

UNITED STATES PATENT OFFICE 2,207,828

APPARATUS FOR MAKING EXTRACTIONS FROM ORGANIC SUBSTANCES

Lewis J. Schwanke, Kouts, Ind.

Application October 27, 1937, Serial No. 171,393

3 Claims. (Cl. 202—1)

My invention relates to improvements in apparatus for separating organic substances and it more especially consists of the features pointed out in the claims.

The purpose of my invention is to provide a process and associated apparatus for producing fermentation from chlorophyllic organic matter in order to procure a concentrated separation and a volatile by-product. The consecutive steps of the process substantially include the following. The organic substances are placed in suitable hermetically sealed vats of reinforced construction, containing water, which are subjected to a moderate temperature of approximately 85° F. adapted to separate out the volatile parts of the material under treatment. The accumulated gases from the containers or vats are carried through a water filter, which separates the volatile product coming from the vats into heavier and lighter portions. The lighter parts pass off and may be used as a fuel gas to supply warmth to the vats. The gas may be used at once or it may be stored for any desired purpose. I also provide automatic safety valves, pressure gauges, and a check valve in the pipe line leading from the vats or containers to the filter to prevent any back flow of gas from the filter toward the vats. The process is continuously automatic after the charging of the vats. The residue in the vats is removed, dehydrated, and reduced in a retort to a carbon compound which serves a useful purpose by being returned to the vat to be mixed with a new supply of material when recharging takes place or used separate as a liquid plant food.

With these and other purposes in view I illustrate in the accompanying drawing such an instance of adaptation as will disclose the broad feature of the invention without limiting myself to the specific details shown thereon and described herein.

Fig. 1 is a diagrammatic plan view showing the arrangement of the vats, etc.

Fig. 2 is an elevation in secton of a single vat with its safety and other valves and a pressure gauge.

Fig. 3 is an elevation of a water filter.

Fig. 4 is a cross section of a solarium in which the vats are warmed by sunlight.

Fig. 5 is an elevation of a structural feature for holding the vat covers in place and the means for removing the vats from beneath the covers to be serviced.

Fig. 6 is a cross section of a pipe and an attached ground wire.

In practicing my invention I may use whatever alternatives or equivalents of steps or types of apparatus that the exigencies of varying conditions may demand without departing from the broad spirit of the invention.

As a certain degree of warmth at a moderate temperature is advantageous I prefer to install my apparatus for the summer seasons in a solarium that comprises glass sides and a glass roof provided with adequate ventilation, so as to maintain a constant temperature of approximately 85° Fahrenheit. For the winter seasons I may use any fuel gas products that arise during the operation of my apparatus to assist in keeping the room temperature at approximately 85° Fahrenheit. If desired and at any time needed owing to an absence of sunshine and for overnight periods I may also use the separated fuel gas to add warmth to the air in the treatment room so that not only the room but the containers or vats and their contents shall remain at a continuous approximately uniform temperature.

Any desired form of glazed walls 1 and roof 2 shown in Fig. 4 may be employed to house the digesting tanks, vats, or containers 3. To provide other sources of heat radiators 4 may be provided. Any desired form of natural or artificial ventilation (not shown) may be incorporated in the building. At one end a laboratory 5 is arranged for. The required doors for ingress and egress are formed in the walls and partitions as may be required.

As instanced in the drawing there are ten containers 3 in the room so spaced as to allow ample passageways between them. They are connected in series so that the released gases will traverse the outflow pipe 6 into the laboratory 5 where the pipe enters the bottom of a water filter 7. In passing upward the lighter gases are separated from the residue which may be drawn off from the bottom of the filter tank and used for any purpose and the lighter gas is all taken away for storage or all or a part is used as a fuel gas to provide heat for the radiators 4.

The containers 3 are formed of reinforced concrete walls 8 shown in Fig. 2. Four U shaped rods 9 are imbedded in the concrete sides and the U part is imbedded in the bottom. The rods are positioned at right angles to each other. They serve a double purpose, as a reinforcement and as a means for fastening the concrete cover 10 by means of nuts.

The cover by means of a gasket 11 hermetically seals the container. It is reinforced by transverse bars 12 and it has a protecting ring 13 around its lower edge which serves as a protection against chipping and also as a circular reinforcement. The side walls 8 of the container are further reinforced by means of horizontal rings 14.

A wire mesh basket 15 is inside of each vat 3. It is provided at its top with any kind of hooks or rings 16' by which it is lifted out of the vat when necessary to remove any inert fiber that may remain after a previous charge has been digested. An empty basket is of course replaced in a vat and it is charged with organic materials in their live state as near as possible and water is added. The cover is secured in place. Then due to the uniform room temperature of about 85° F., fermentation will take place and the volatile constituents will become separate and rise to the top of the vat. This is continued long enough until all the gases are separated which may require several days. As the gases are freed the pressure in the vats rises to about 40 pounds per square inch throughout the entire system. As a precaution against accidents the vats or tanks are tested to about 100 pounds per square inch and a safety valve 16 is placed on each tank cover 10. It is positioned at the upper end of a pipe which includes a pressure gauge 17 and a manual release valve 18. The pipe 19 passes through a tube that is molded into the concrete. There is a gasket on the upper and under face of the cover and washers and nuts hold the gaskets against the tube by the nuts being threaded onto the pipe 19.

This same construction is used for the outlet pipe 20 as it passes through the cover. It has a shut-off valve 21, and a T located in the outflow pipe 6. This arrangement enables the attendant to disconnect any individual tank without interfering with the others. Other pressure gauges and safety valves may be installed at other points of the system as is found desirable. Each safety valve may have a vent pipe leading to the outside of the building. As the first gases become separated from the material in the tank they are rather explosive and to afford protection against static electricity all the outflow and other pipes are grounded by means of a copper wire 21 of maximum capacity soldered to the pipes at certain points. It is grounded at the one or more points in any conventional manner. To afford drainage of the tanks 3 a drain valve 22 is placed near the bottom and another valve 23 is positioned toward the upper part of the tank as shown in Fig. 2. These valves are connected to pipes which pass through the concrete wall in a similar manner to the pipes 19 and 20 which pass through the cover with this exception that the inside nuts are in a recess formed on the inner face of the concrete so as to not project into the path of the basket 15. The capacity of each tank is approximately fifty-five gallons and it is filled with live organic material and water to about the top drain valve 23. These drain valves may be of the globe type to withstand a maximum safety pressure.

The filter tank 7 may be placed in the testing room 5. It receives the gases from the vats 3 through the outflow pipe 6. It has a gauge glass 24 to indicate the water line. There is a valved water inlet 25 placed on the top of the tank. The heavier parts of the gases that come over from the digesting vats 3 as they reach the water in tank 7 are condensed and the lighter parts pass upward through the water and they pass out through the discharge pipe 26.

The condensate is drawn off from the tank 7 by means of a valve 27 at the bottom. This residue may be employed in various ways for different purposes. Lowering of the water level by withdrawing the heavy residue is restored by an additional supply of water through the inlet 25. The gas that flows from the tank 7 is a rich fuel gas that may be used in part in the test room for a hot-water heater 28 so as to supply the laboratory with hot water. The main portion of this gas will serve the gas radiators 4 through a pipe 32 located in the generating room 29. A valve 30 in pipe 26 controls an outlet through which gas may be passed into storage receptacles similar to Skelgas. A conventional gas meter 31 may be placed in the pipe 26 to register the output.

In order to facilitate and expedite the charging of the vats I may use any desired form of overhead crane and underneath trolley. The baskets 15 may be lifted out of the vats by means of a chain operated trolley 33, that runs on an overhead I beam 34, and the contents dumped for storage or for use in the same vat after it is recharged with new material. This of course all takes place after the vat 3 has been removed from beneath the cover.

The covers and their connected pipes are permanently supported on transverse channels 35, one channel for a pair of vats. These channels rest on an I beam 36 that is placed between two rows of vats, Fig. 5 and it is supported on structural iron or other posts 37.

The vats nominally rest on a platform 38 which is raised and lowered by means of a worm actuating a threaded gear that serves to lower and raise the vats so as to drop them away from the covers. As soon as the vat is lowered sufficiently to clear the cover the trolley 39 is moved sidewise on a track so as to bring the vat underneath a trolley I beam 33. A concrete abutment 40 is formed to limit the inward movement of the trolley 39 to leave the vat in position beneath the cover so that the rods 4 will register with the corresponding holes in the cover as the vat is raised into operative position.

The vats are first charged with waste chlorophyllic or live green material such as weeds, clovers, etc. and about thirty-five gallons of water to which any desired accelerating chemical may be added. Thereafter in about three days more or less fifteen gallons of water are added, to complete the extraction. When the pressure is sufficiently reduced at the end of the extraction period, as indicated by the gauge 17, the shut-off valve 21 is closed and the vat is removed to be recharged. The manual release valves 18 and the safety valves may both be connected to a safety vent pipe leading to the outside of the building.

The filter tanks are of ample capacity and sufficient strength to withstand the working pressures and the residue is withdrawn at the bottom of the tank. It has valuable qualities available for many different uses, such as a concentrated plant food, etc., etc.

What I claim is:

1. In a separating apparatus, a vat for holding organic substances, reinforced walls for the vat, a cover, means for holding the cover in a fixed position, means for disconnecting the vat from the cover, and means for shifting the vat to one side of the cover for charging it with the material and for replacing the vat beneath and into engagement with the cover, means for supplying external heat to the vat, means communicating with said vat for collecting the volatile portions of the contents of the vat, means for separating the volatile portions into heavier and lighter parts the heavier parts being segregated for any desired purposes, and means for using the lighter portions as a fuel to maintain the vats at a desired temperature.

2. In a separating apparatus, a vat for holding chlorophyllic organic substances, reinforced walls for the vat, a cover therefor, means for separating the cover from the vat by moving the vat from beneath the cover so as to be charged by the material and re-engaging the vat and the cover, means for supplying external heat to the vat to separate the volatile portions of the contents, means communicating with said vat for collecting the volatile portions of the contents externally of the vat, associated means for separating the volatile portions into heavier and lighter parts the heavier parts being segregated for fertilizing purposes, and means for using the lighter portions as a fuel to maintain the vat at a desired temperature.

3. In a separating apparatus, a vat for holding chlorophyllic organic substances, reinforced walls to the vat, a cover therefor, means for separating the cover from the vat by moving the vat from beneath the cover so as to be charged by the material and reengaging the vat and the cover, means for supplying external heat to the vat to maintain it and its contents continuously at moderate temperature of approximately 85° F. to separate the volatile portions of the contents, means for communicating with said vat for collecting the volatile portions of the contents externally of the vat, associated means for separating the volatile portions into heavier and lighter parts the heavier parts being segregated for fertilizing purposes, and means for using the lighter portions as a fuel to maintain the vat at a moderate temperature of approximately 85° F.

LEWIS J. SCHWANKE.